UNITED STATES PATENT OFFICE.

PETER H. VANDER WEYDE, OF BROOKLYN, NEW YORK.

METHOD OF WATERPROOFING TEXTILE FABRICS, LEATHER, &c.

SPECIFICATION forming part of Letters Patent No. 236,198, dated January 4, 1881.

Application filed June 15, 1880. (Specimens.)

*To all whom it may concern:*

Be it known that I, P. H. VANDER WEYDE, of the city of Brooklyn, Kings county, State of New York, have made a discovery in the Process of Waterproofing Textile Fabrics, Leather, Feathers, Artificial Flowers, &c., and founded upon it an invention, of which the following is a complete description.

I have discovered that the mineral resins found in different parts of the earth, and known under the general names of "mountain tallow," "lignite camphor," "fossil wax," &c., are especially adapted for making textile fabrics and similar substances water-repellent. There are several of these resins known under various local names. They are, for instance, the "berengelit," from Arica; the "branchit," from Tuscany; the "elaterit," from England and France; the "fichtelit," from Germany; the "fossil wax," from Hungary; the "hartin" and "ixolyt," from Austria; the "Giron resin," from South America; the "hatchetin" and "Highgate resin," from England; the "idriatin," from Idria; the "koenlit," from Switzerland; the "middletonit," from New Castle; the "naphthadil" or "stone tallow," from the Caspian Sea; the "ozokerit" or "earth-wax," from Moldavia; the "plauzit," "retinit," and "scheererit," of Switzerland; the "phyloretin," "tekoretin," and "xyloietin," of Denmark, &c. All these resins, more or less similar to one another, differ entirely from paraffine in more than one respect. While paraffine is homogeneous, and may be totally distilled over unchanged by the evaporation, the mineral substances referred to are mixtures of different resins, having different degrees of volatility, so that by distillation they can be separated, while in general the temperature required for their volatilization and their boiling-point is higher than that of paraffine. Then paraffine is soluble in ether and other solvents, which the mineral substances are not, ether dissolving only a small portion, so that by evaporation or solution their constituents can be separated. This is especially the case with the ozokerit or earth-wax, from Moldavia, which is the principal substance I use, for the double reason of its special adaptability for my purpose and its accessibility, having been lately introduced into the trade, chiefly as a substitute for bees-wax, being now largely used for its adulteration. Evaporation and solutions in ether may extract from it a comparatively small quantity of a substance similar to paraffine; but the remainder is by far the most valuable for waterproofing textile fabric, as it is more permanent, not being lost by gradual evaporation consequent to repeated exposure to the hot sun, nor as easily washed out with water and soap as is the case with paraffine.

For want of better nomenclature, I have designated the principal constituent resins of the ozokerit, such as may be separated by evaporation and solution, by the letters "$a$," "$b$," and "$c$," and call the most volatile paraffine-like constituent "a-ozokerit," the soluble portion "b-ozokerit," and the insoluble and least volatile portion "c-ozokerit." The latter, in fact, cannot be distilled without destructive decomposition—a fact which most strikingly shows the difference between the mineral resins in question and the ordinary paraffine.

In order to use the ozokerit for the purposes of waterproofing I employ different methods, the one which forms the subject of the present invention consisting in passing the vapor of the same, evolved by heating it to some 400° to 500° Fahrenheit, into a closed box in which the objects to be heated are placed. The hot vapors will soon fill the box and diffuse themselves in the texture and pores of the material, so that after the lapse of a few hours (more or less, according to nature and thickness) it will be sufficiently permeated to make it water-repellent.

For securing a more perfect permeation a vacuum may previously be made in the box by extracting the air by an air-pump. After exhaustion the vapors are admitted. This precaution is especially useful when treating large masses of heavy fabrics, such as rolls of carpets. It should be remarked that in this case the vessel must be of an arched form, so as to withstand atmospheric pressure, and be hermetically sealed.

I claim—

The process of waterproofing the fibers of textile fabrics, leather, feathers, artificial-flowers, &c., which consists in subjecting them to the vapors of ozokerit in the manner described.

P. H. VANDER WEYDE.

Witnesses:
E. B. HARPER,
GEO. H. FLECKENSTIEN.